Nov. 24, 1942.  C. M. ANDERSON  2,303,071
DRAW WORKS
Filed April 26, 1940
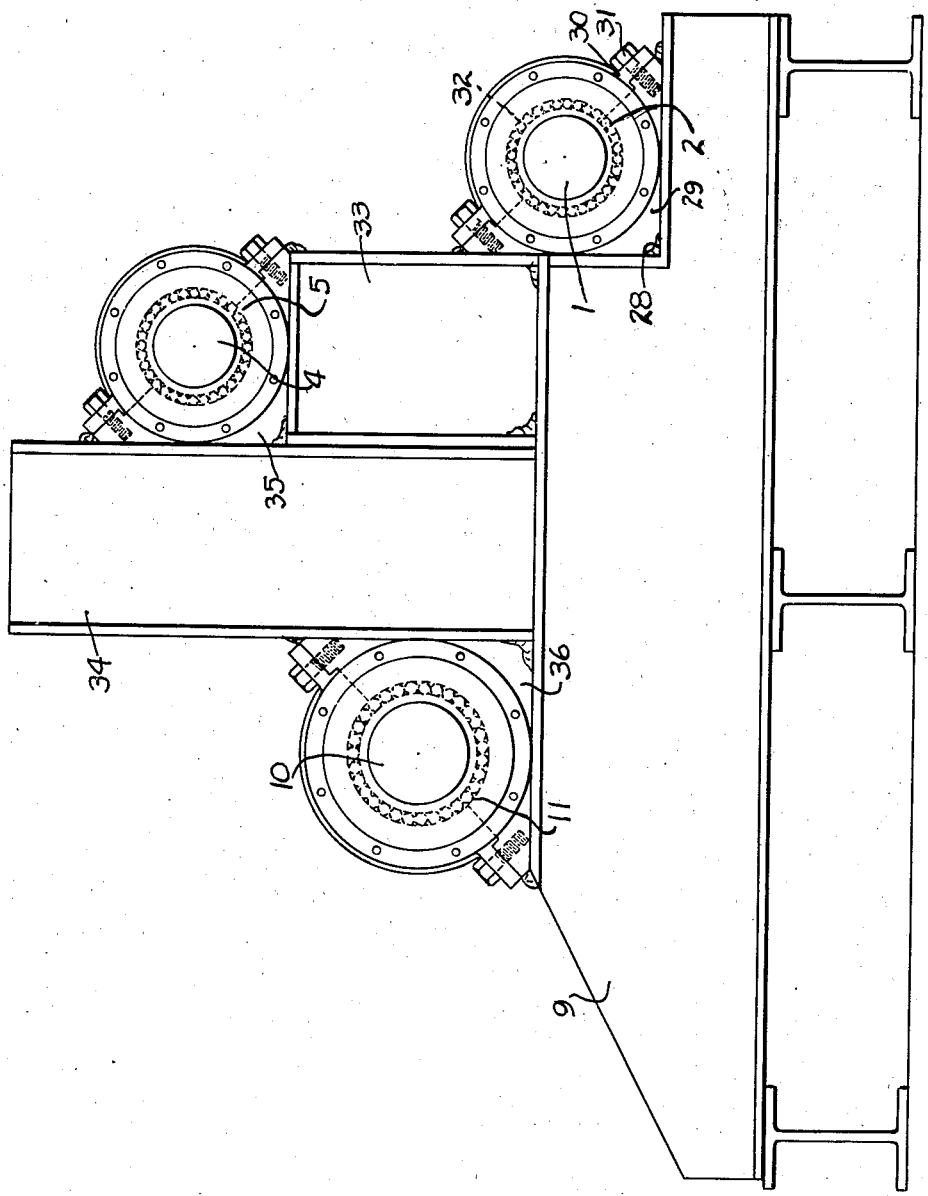
Carl M. Anderson INVENTOR.
BY
ATTORNEYS Patented Nov. 24, 1942

2,303,071

UNITED STATES PATENT OFFICE 2,303,071

DRAW WORKS

Carl M. Anderson, Corsicana, Tex., assignor, by mesne assignments, to The First National Bank of Corsicana, Corsicana, Tex., a corporation Application April 26, 1940, Serial No. 331,703

3 Claims. (Cl. 248—19)

This invention relates to hoisting devices and has particular application to draw works to be employed in oil field operations for raising and lowering loads such as drill pipe and the like in the well.

The ordinary draw works has in connection therewith a power transmission mechanism by means of which various speeds of rotation may be communicated to the hoisting reel. Such mechanism includes a jack shaft, operated from a source of power, a line shaft, and a drum shaft. In constructions now commonly used, in order to provide a plurality of speeds to the draw works, it is customary to drive from the jackshaft up to the lineshaft and from the lineshaft down to the drumshaft. This construction induces heavy stresses high up on the draw works frame structure, which in turn makes necessary very heavy bases to resist the heavy loads and vibration at high speed.

The general object of the invention is to provide a support for the three shafts of the draw works which have previously been indicated, which will be compact in form and particularly strong and durable but relatively light in weight. I desire to employ but one set of posts and to mount upon the base adjacent the post the bearings for the shafts in a particularly strong and durable construction.

A better understanding of the invention may be had by reference to the single figure of the drawing herewith which shows an end elevation of the supporting structure showing the manner in which the shafts are mounted at their ends.

In the drawing I have shown an end elevation of the sturdy and durable type of supports which are provided for the shafts 1, 4 and 10 of the draw works. I have the base member 9 mounted upon a support of any desirable construction, the base member comprising spaced parallel supporting beams. As will be noted in the drawing, the shaft 1 is supported within an angle 28 formed by cutting away a portion of the upper side of the beam 9 at its end. Within this angle I place a bearing block 29 which may be welded in position on the frame. This block is adapted to receive the shaft 1 which is held in position thereon by a cap member 30 fitting about the shaft and having its end extended to receive the bolts 31, thus securing the shaft bearing in position. It may be understood that anti-friction bearings such as are shown at 32 in dotted lines may be employed in mounting the shaft in position.

In mounting the shaft 4 a similar construction is employed. A short post 33 is mounted upon the beam 9 and adjacent thereto is the jack post 34. These two posts are welded in position upon the base and project upwardly therefrom, the post 33 providing a support for the bearing 35 for the shaft 4.

On the opposite side of the jack post 4 is a bearing support 36 for the drum shaft 10. These bearings are supported upon approximately triangular blocks 29, 35 and 36, which, as previously noted, may be welded into connection with the adjacent portion of the frame work. The bearing block 29 thus not only serves to support the shaft but it helps in securing the post 33 in position upon the framework. Similarly the bearing block 35 for the shaft 4 when welded into connection with the posts 33 and 34 will serve as a brace between these posts, helping to form a rigid supporting structure. Also, the bearing block 36 when welded in position will help to brace the jack post 34 on that side and assist in forming a sturdy construction, supporting the shafts in their positions.

The structure described is particularly simple and strong and will be enabled to endure the heavy strains to which the device is subjected.

What is claimed is:

1. A draw works having a base, including parallel beams, a pair of opposite jack posts on said beams, a short supporting post on each of said beams adjacent one side of each of said jack posts, said posts being welded to said base, angular bearing blocks set upon said frame, one on each side of said jack post and another upon said beams adjacent the lower ends of each of said supporting posts, said bearing blocks being welded in position to assist in holding said beams and said posts in rigid position and shafts supported in said bearings.

2. A frame for draw works including parallel steel side beams, upright jack posts secured to said beams, a short supporting post closely adjacent said jack post, said side beams being cut away at one end adjacent their upper sides to form an angle at one side of said supporting posts, bearing blocks rectangular on one side to engage in said angle and also in angular positions on each side of said jack post, said blocks being welded in position to tie said blocks and said posts rigidly upon said frame.

3. A draw works comprising a base including a pair of spaced side beams, an upright jack post secured to each of said beams and forming at one side thereof an angular bearing support, a supporting post adjacent the other side of each of said jack posts each of said supporting posts forming with the adjacent jack post and with the associated beam angular bearing receiving supports, and bearing blocks secured in each of said bearing supports.

CARL M. ANDERSON.